March 4, 1941.  R. D. WYCKOFF  2,233,992
METHOD OF AND APPARATUS FOR SURVEYING WELLS
Filed Jan. 3, 1938  4 Sheets-Sheet 4
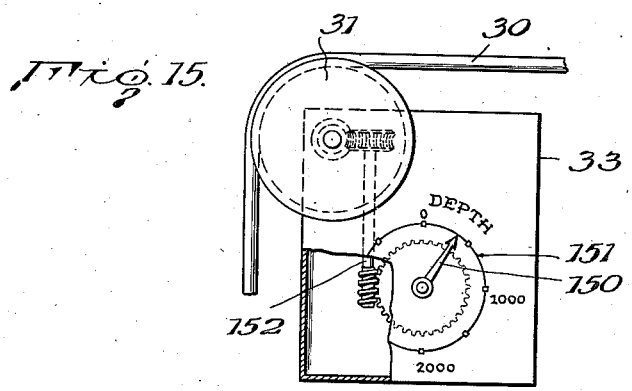
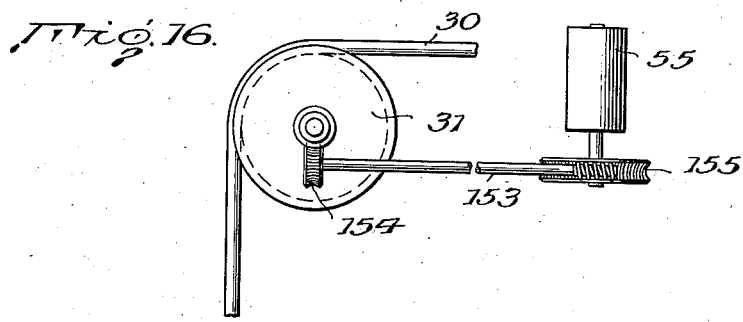
Inventor
Ralph D. Wyckoff,
By
Attorney Patented Mar. 4, 1941

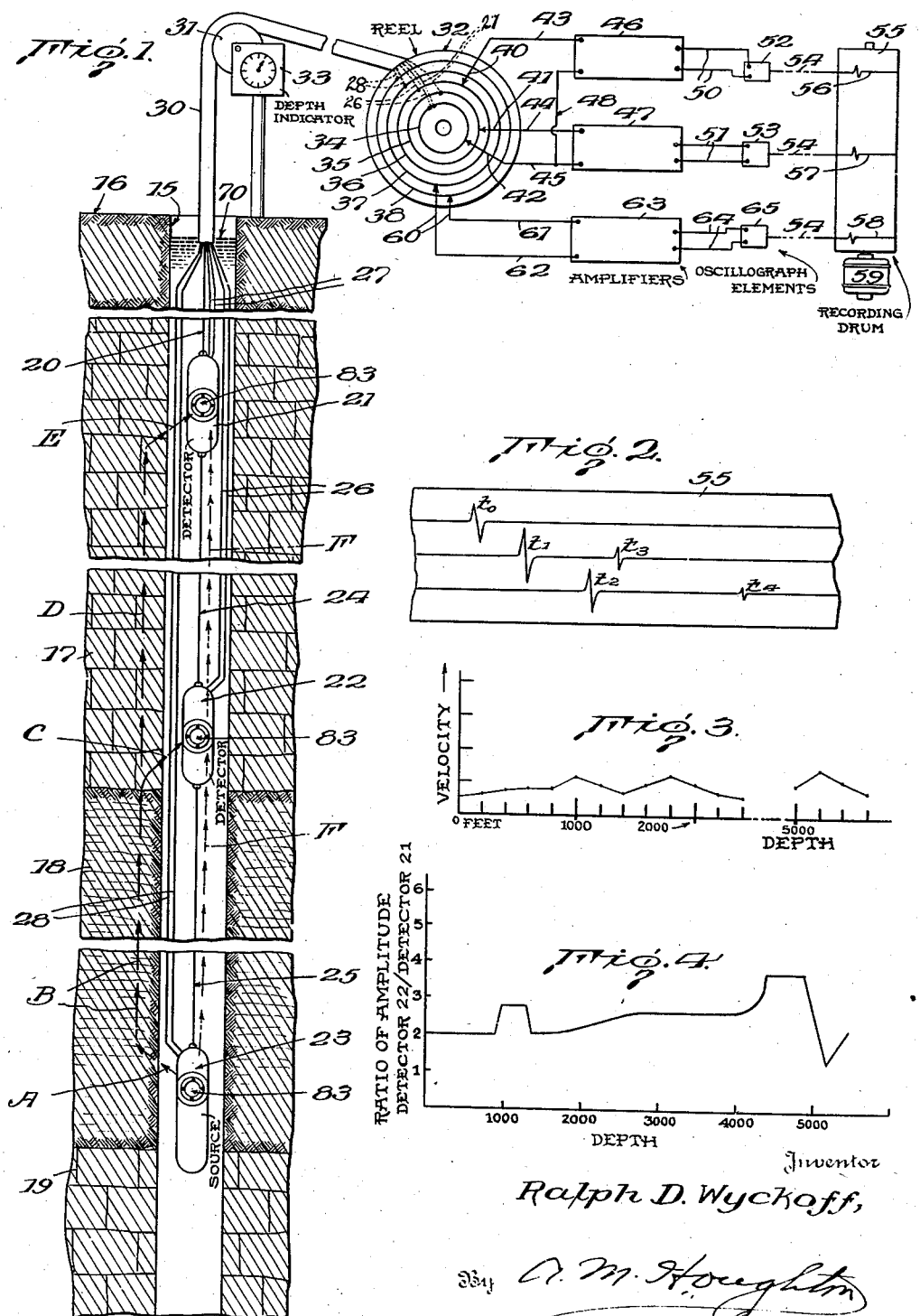

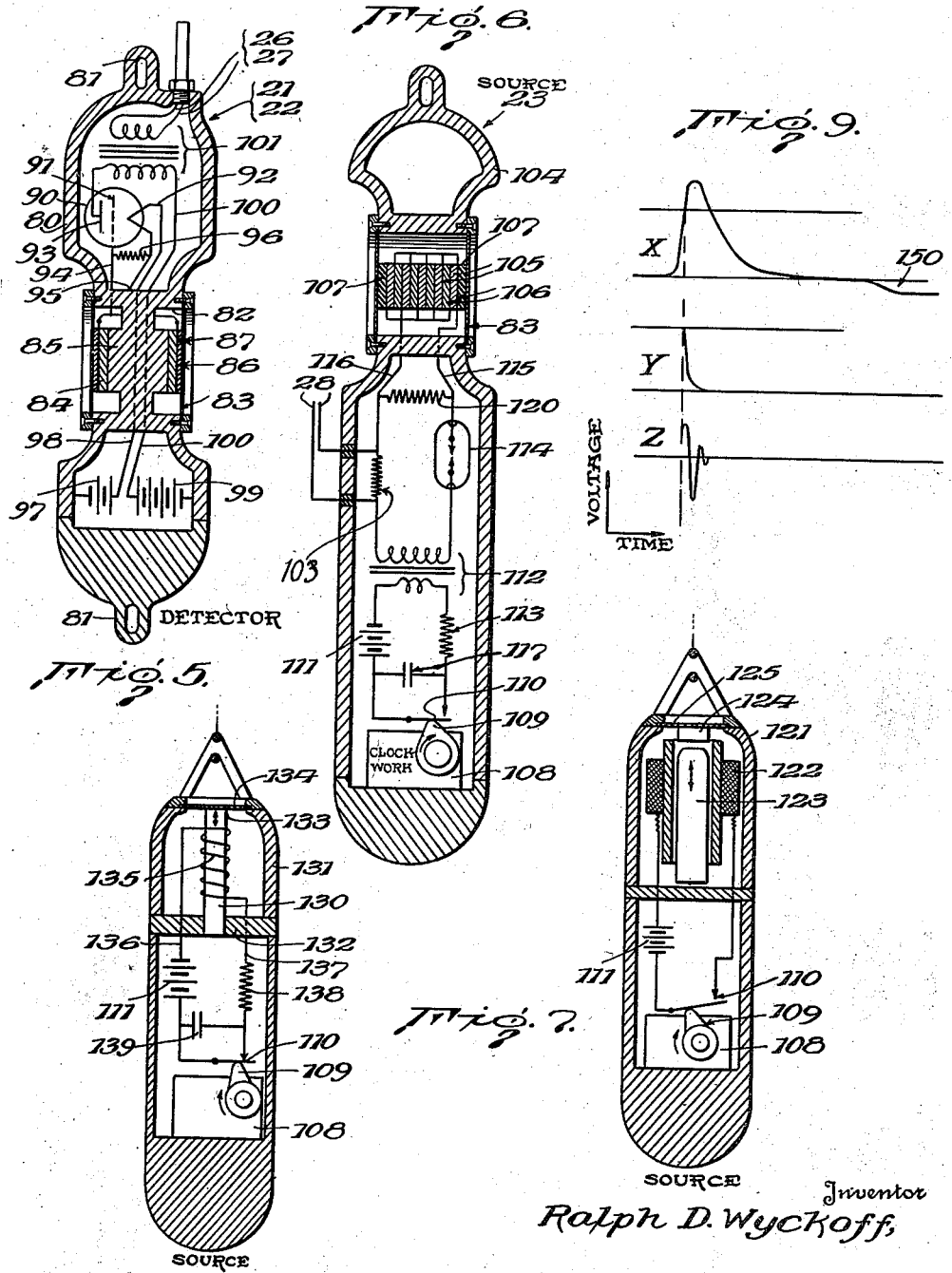

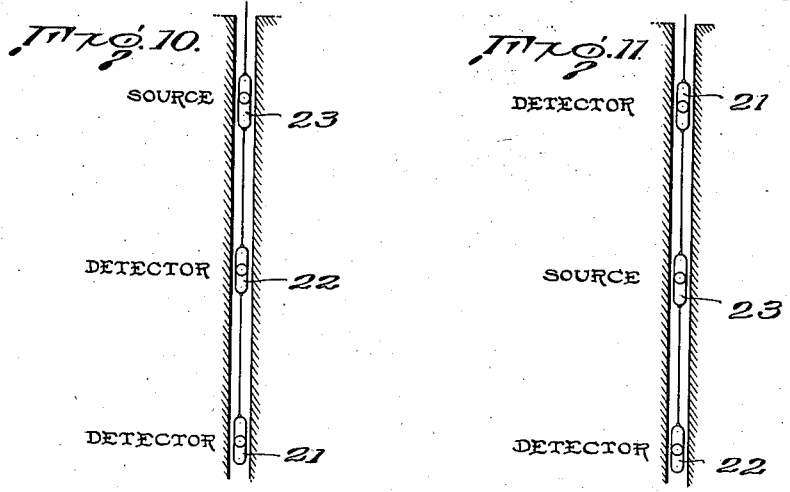
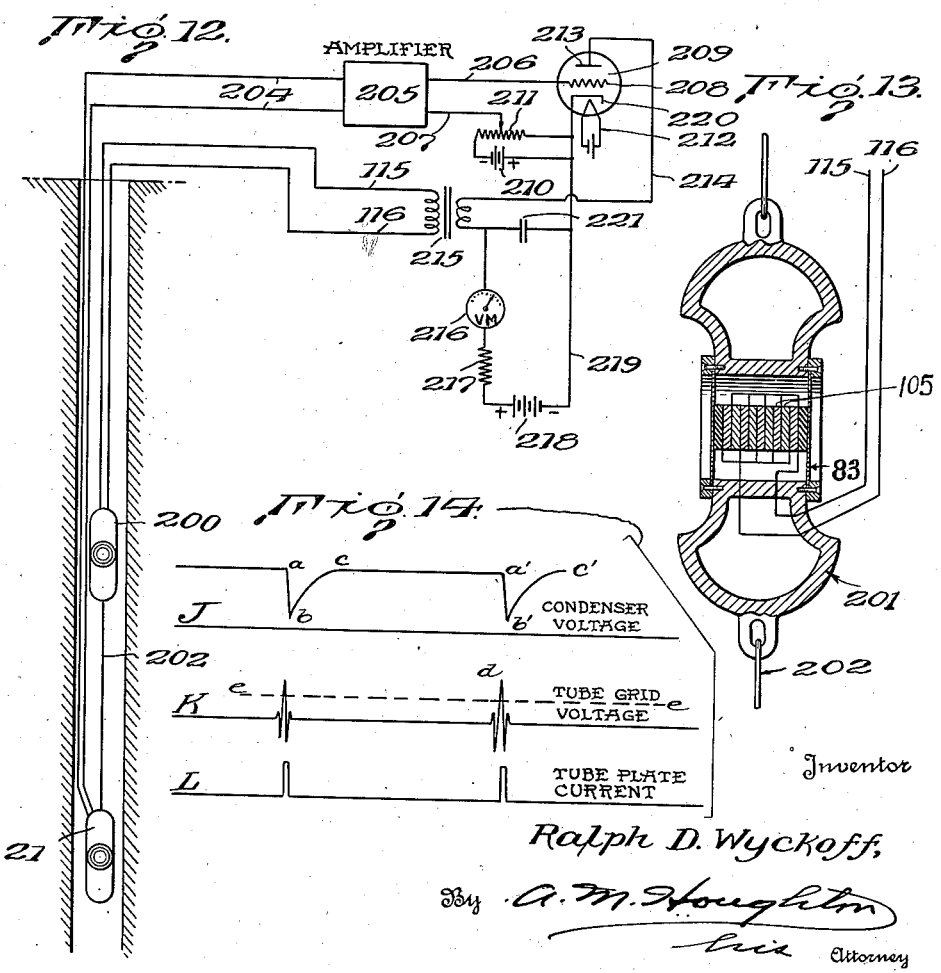

2,233,992

UNITED STATES PATENT OFFICE 2,233,992

METHOD OF AND APPARATUS FOR SURVEYING WELLS

Ralph D. Wyckoff, Houston, Tex., assignor to Gulf Research & Development Company, Pittsburgh, Pa., a corporation of Delaware Application January 3, 1938, Serial No. 183,214

7 Claims. (Cl. 181—0.5)

This invention or discovery relates to methods of and apparatus for surveying wells; and it comprises a method of making stratigraphic surveys in earth bores, including the steps of generating sharp pulses of sound at intervals at one level in the bore hole, detecting at two other levels the first sound pulse to reach each level from the level of sound generation, and recording the time of arrival and the amplitude of the detected pulses; the method sometimes being modified for automatic generation of pulses under control of detected pulses, at a rate which is a measure of the velocity of sound in the neighboring rock; and it further comprises apparatus useful for carrying out the method; all as more fully hereinafter set forth and as claimed.

In determining the character and arrangement of sub-surface rocks penetrated by a bore hole, it is now common practice to supplement ordinary geological methods, and actual sampling, by so-called "electrical surveys" of the bore hole. Such surveys have found their most important use in connection with wells or bore holes drilled for oil or gas, to determine stratigraphy and to correlate stratigraphy among a number of holes. The electrical surveys mostly make use of measurements of the variations in electrical conductivity at various levels in the well. From these measurements electrical well logs, which are charts showing the variation of conductivity with depth, can be made.

While electrical surveys sometimes yield valuable information, they have the disadvantage that the results are often ambiguous. The electrical conductance of a rock depends to a considerable extent upon the amount and character of liquids in the rock (water or sometimes oil). Two widely different rock layers may have identical conductivities if both layers are saturated with brine. And the same rock has a different conductivity when wet than when dry.

Temperature surveys in bore holes have likewise found some application, but of course temperature is not an inherent differentiating characteristic of rocks, and the best that such surveys can do is to aid in tracing strata from one bore to another.

According to the present invention I provide a method for making bore hole surveys, in which primary physical properties of the rocks are measured; namely the acoustic properties, which depend on elasticity, state of aggregation, etc., of the rock and are much less affected by adventitious conditions such as presence of brine, than are secondary properties. Rock is used herein in its geological sense, including sand, clay beds, etc., as well as hard rock.

In my logging method sound is generated at one level in the bore hole and is propagated in the surrounding rock. The waves traveling through the adjacent rock have certain of their characteristics altered according to the acoustic properties of the rock. I measure and record one or more characteristics of the sound which are altered by the rock, thus obtaining an index of the acoustic properties of the rock at one level in the bore. I then generate sound at a different level and measure and record the same characteristic of sound as before, thus determining the variation in acoustic properties of the rock at different levels. The operations may be repeated at any desired number of levels. Various acoustic properties can be determined, for example; the velocity of sound in the rock, the attenuation (diminishment of amplitude or volume) of sound produced by the rock, or the impedance to sound. Rocks have characteristic sound transmission velocities, thus a determination of the velocity of sound in the rock gives an indication of the type of rock adjacent the source of sound. In different rocks the sound is attenuated to different extents, by passing through a given thickness of rock, thus the determination of the attenuation gives an indication of the type of rock. Similarly acoustical impedance measurements can be used which will not only indicate changes in attenuation but simultaneously will measure the reactive component which is involved when reflections occur within the acoustical system.

Depending on the characteristic to be determined and on the particular requirements, various organizations of apparatus can be used. The operation and the utility of the method will be apparent from the description of certain specific embodiments following.

In the accompanying drawings I have shown, more or less diagrammatically, several examples of apparatus within the purview of the invention, and useful in the performance of my process. In the showings:

Fig. 1 is a diagrammatic view, partly in elevation and partly in vertical section of one system in place in a well, this system being particularly adapted for determining the velocity of sound in the rock, the attenuation through the rock, or both;

Fig. 2 is an idealized reproduction of a chart obtained with the apparatus of Fig. 1;

Figs. 3 and 4 show, schematically, typical well logs constructed from the data supplied by the apparatus of Fig. 1;

Fig. 5 shows one form of detector suitable for use with the apparatus of Fig. 1;

Figs. 6, 7 and 8 show three useful forms of sound sources adapted to give pulses of sound;

Fig. 9 illustrates the character of sound pulses produced and received;

Figs. 10 and 11 show two optional arrangements of the sources and detectors;

Fig. 12 is a diagrammatic view partly in elevation and partly in vertical section of a modified system for determining the velocity of sound in the rock involving generation and detection of a succession of sound pulses at a rate determined by the velocity of sound in the rocks;

Fig. 13 is a detail view of the sound source of Fig. 12;

Fig. 14 is a graph showing, as a function of time, characteristic variations at certain points in the electrical circuit shown in Fig. 12;

Fig. 15 is a diagrammatic view in elevation of the depth indicator; and

Fig. 16 is a diagrammatic view of the arrangement whereby the cable pulley drives the oscillograph drum.

Referring to Fig. 1, this illustrates my method applied to the study of a well bore 15 extending downward from the surface of the earth 16 through various strata. Three different strata are shown at 17, 18 and 19. According to the embodiment of the invention there is lowered down the well, by means of a supporting cable 20, an assemblage of two acoustic detectors 21 and 22 of the electrical type and a source 23 of pulses of sound, elements 21, 22 and 23 being interconnected mechanically in spaced relation by cables or other suspending means 24 and 25, of such character as to be poor transmitters of sound, e. g. soft rope or chain. Each detector has two leads or wires leading therefrom to deliver the electrical output and indicated at 26 and 27. In this embodiment the source also has two wires 28 leading therefrom for a purpose to be described. The several leads and the supporting cable 20 are combined in a housing 30. The composite cable passes over a supporting pulley 31 and thence to a reel 32, by means of which the detector-source assembly can be raised and lowered in the well. Pulley 31 is arranged to drive a depth indicator 33, of known type, whereby the depth of the assembly in the well may be ascertained at any time. The reel is provided with collector rings shown diagrammatically at 34, 35, 36, 37, and 38. These are connected to the several wires in housing 30. Rings 34, 35, and 36 take the output from the two detectors and rings 37 and 38 are in communication with wires 28 from the source. Three brushes 40, 41 and 42 take the output from rings 34, 35, and 36 and supply it, through leads 43, 44 and 45 to a pair of amplifiers 46 and 47; amplifier 46 being cross-connected to lead 45 as shown at 48. The output of the amplifiers is delivered through leads 50 and 51, respectively, to a pair of oscillograph elements 52 and 53, of any convenient type. These elements are adapted to project a focused beam of light 54 upon a traveling surface 55 of photographic sensitive material (film or paper) moved by a motor 59. Thus energization of the oscillograph elements produces traces 56 and 57 on the recording film or paper. A pair of brushes 60 makes contact with rings 37 and 38 and two leads 61 and 62 connect the brushes with a third amplifier 63, delivering through a lead 64 to an oscillograph element 65 similar to the others, and arranged to produce a trace 58 on the film.

The depth can be obtained from the depth indicator 33 or if desired pulley 31 can be arranged to drive the oscillograph drum or tape 55 directly. Fig. 15 shows the conventional depth indicator 33 by itself, in a diagrammatic manner, as comprising a pointer 150 cooperating with a scale 151 and driven from pulley 31 through speed-reducing gearing 152 as shown. The pointer is moved over the scale proportionally to the length of cable passing over the pulley. Fig. 16 shows diagrammatically an arrangement for driving the oscillograph drum directly. Pulley 31 drives a shaft 153 through speed-reducing gears 154, and the shaft drives the drum 55 through speed-reducing gears 155.

The bore is advantageously filled with any suitable liquid, such as oil, water or drill mud. The upper level of which is indicated at 70.

Considering the operation of the device; as stated, source 23 is of a type (described in detail below) adapted to send out sharp pulses of sound separated by relatively long quiet periods. Assuming one such pulse to be emitted by the source, sound traverses a short path of liquid between the source and the bore wall, as indicated by the arrow A, and traverses rock 18 as indicated by arrows B. Some of the sound reaches detector 22, through another short liquid path C, and some of the sound passes upward (arrows D) and reaches detector 21 through a third short liquid path E. Furthermore some of the sound reaches the detectors by passage directly through the liquid, as indicated by dotted arrows F. Liquid paths A, C and E are approximately equal, and can be considered as exactly equal without introducing substantial error.

Wires 28 transmit to the recorder a portion of the energy of the source when it sends out the pulse, and this produces a sharp fluctuating trace, or wiggle, in the record, as indicated at $t_0$ in Fig. 2. The sharp fluctuation is preceded and followed by relatively long quiet periods, as is evident from the record shown in Fig. 2. Upon receipt of sound at detector 22, a sharp fluctuating trace $t_1$ is produced, and reception of sound at detector 21 similarly gives a trace $t_2$. Traces $t_0$, $t_1$ and $t_2$ are spaced from each other as shown, due to the time taken for travel of sound through the rock. There will also be produced two later traces $t_3$ and $t_4$, due to reception at the detectors, of sound waves passing directly through the liquid column in the well bore. These traces usually come later, because the velocity of sound in water, oil or mud is most frequently lower than that in rocks. Traces $t_3$ and $t_4$ are simply ignored.

Denoting the velocity of sound V in rocks 17 and 18 and liquid 70 as $V_{17}$, $V_{18}$, and $V_{70}$, the time interval $$t_1 - t_0 = V_{70}(A+C) + V_{18}(B)$$

wherein A, B and C denote the path lengths shown in Fig. 1, and $$t_2 - t_0 = V_{70}(A+B) + V_{18}(B) + V_{17}(D)$$

Since path E may be considered equal to path C, $$(t_2 - t_0) - (t_1 - t_0) = (t_2 - t_1) = V_{17}(D)$$

Distance D is known, as it is merely the fixed separation between the two detectors, determined by the length of rope 24. Thus by a measurement of the recorded time interval $(t_2 - t_1)$ only, on the oscillograph record, it is possible by the last equation, to determine the velocity of propagation of sound through the rock 17 by path D, independent of the partial path through the liquid.

Rocks have characteristic sound transmission velocities. For example, certain particular rocks in one oil field have characteristic velocities as follows:

| | Feet per second |
|---|---|
| Shale | 5,000+ |
| Sandstone | 4,600– 7,000 |
| Limestone | 12,500–19,000 |

For comparison, the velocity of sound in water is 4700 feet per second. Thus determination of V as described gives an indication of the type of rock. However, the system is useful even when no attempt is made to identify the particular rocks traversed, by the measured velocities. Thus by making surveys in various bores, strata can be traced and sub-surface contours mapped. A characteristic jog in the curve for one well appears at the same or a different level in other wells.

Fig. 3 shows a typical well log, showing measured velocities plotted against depth. The depth readings can be obtained as described. Fig. 3 indicates a high velocity stratum at depth 1000 feet, a low velocity stratum at depth 1400 feet, etc.

While trace $t_0$, giving the instant of propagation of the sound pulse, is sometimes useful, it is not necessary in obtaining the required data, and if desired, the recording system for the sound pulse initiation can be omitted; that is, wires 28, rings 37 and 38, brushes 60, amplifier 63 and oscillograph element 65 can be omitted.

If desired the source-detector combination can be lowered (or raised) in continuous motion in the well, and the sound pulses generated at regular intervals. Or, the source-detector combination can be lowered or raised stepwise.

The device of Fig. 1 may also be used to measure and compare sound characteristics of the rock other than the velocity of sound therethrough. Thus, the device is sometimes used to measure the attenuation of sound (i. e. the falling off in volume or dying away) between the source and the respective detectors at different depths in the well. By reference to Fig. 2 it will be noted that trace $t_1$ is of greater amplitude than trace $t_2$, and trace $t_3$ of greater amplitude than trace $t_4$. The amplitude of the traces will of course vary with the attenuation of sound through the rock strata encountered and hence by measuring and comparing the amplitudes of the traces from the respective detectors the rock strata can be traced out.

Fig. 4 shows a typical well log wherein the ratio of the amplitudes of the traces from detectors 22 and 21, respectively, are plotted against depth, the depth readings being obtained as indicated above. The log indicates a stratum between 900 and 1400 feet characterized by relatively high attenuation of sound, a gradual change in rock character between 2000 and 2600 feet indicated by gradually increasing attenuation, a relatively abrupt change of character between 3900 and 4200 feet with a stratum of high attenuation characteristics between 4200 and 5000 feet and an adjacent lower stratum of low attenuation characteristics at 5100 feet.

Fig. 5 shows one suitable detector, of the piezoelectric type. A sealed metal housing 80 is provided, having eyes 81 at each end for attachment of supporting cables, and having two openings 82 covered by thin flexible diaphragms 83, usually of metal. A pair of quartz crystals 84 suitably cut in a known way are rigidly supported by a portion 85 of the housing, one face of each crystal being thus electrically grounded to the housing. The other face of each crystal carries a flat electrode 86, and an insulating plate 87 interposed between the electrode and the diaphragm. Upon occurrence of sound vibrations adjacent the diaphragms, the crystals are subjected to pulsating pressure, which causes them to set up a current of fluctuating voltage (piezo-electric current).

A triode vacuum tube 90 having a filament 92, grid 91 and plate 93, is provided for amplifying the piezoelectric current. The two electrodes (86) are connected in parallel to the grid of the tube by lead 94, while one side of the filament is grounded to the housing at 95 and is thus connected to the inner faces of the crystals. A grid resistor 96 connected as shown serves to maintain the D. C. potential of the grid. The filament is supplied by a battery 97 through a lead 98 and ground, while the plate is supplied by a battery 99 and lead 100. The output from the tube is supplied to a transformer 101 as shown, the output of which delivers to leads 26 (or 27).

Figs. 6, 7 and 8 show three useful forms of sound sources. Fig. 6 shows a piezo-electric sound emitter, based on the same principle as the detector of Fig. 4, and having a housing 104 containing a pile or stack 105 of quartz crystals with electrodes 106 covering each face. The pile is rigidly mounted, by insulating plates 107, between a pair of diaphragms 83 similar to those in Fig. 5. The crystals are so arranged that all expand or contract at the same instant upon application of current to alternate electrodes 106. The means for supplying current to the crystals are as follows. A clockwork 108 drives a cam 109 which intermittently closes a switch 110, at suitable intervals, which may be from a fraction of a second to many seconds. The switch is connected in series with a battery 111, the input of a transformer 112 and a resistance 113. The output of the transformer is connected through a spark gap 114 and leads 115 and 116 with alternate electrodes 106, as shown. Thus upon actuation of the clockwork, pulses of current are sent to the crystal stack, causing the crystals to expand and contract, thereby vibrating the diaphragms and sending out a pulse of sound. As shown, the secondary circuit of the transformer is in series with resistor 103 across which leads 28 connect to record the instant of initiation of the sound wave as described in connection with Figs. 1 and 2. As stated, this connection can be omitted if desired.

Upon closing of switch 110 current builds up rapidly in the primary of the transformer, inducing a high voltage in the secondary. This voltage has approximately the form of curve X in Fig. 9, which represents voltage plotted against time. Curve X also shows at 150 the voltage produced when switch 110 opens. This voltage is suppressed by connecting a condenser 117 of high capacity across the battery circuit as shown. This prevents rapid decay of the primary current in the transformer. The purpose of the spark gap is to produce a more abrupt pulse, as shown in curve Y. The gap breaks down and passes the voltage from the secondary of the transformer to the crystal stack almost instantly when a predetermined high potential develops across the gap. Curve Y shows the character of the sound pulse with the spark gap in place. Such a pulse creates a mechanical oscillation in the stack similar to curve Z, and the oscillation at the detectors is similar to curve Z. It will be noted that the trace indicated by curve Z has a very definite beginning, which makes for high accuracy. The resistance 113 serves several purposes. It limits the current through the coil to a safe value and it shortens the time constant of the voltage build-up. This time constant is equal to L/R where R is the total resistance and the L the inductance of the primary circuit. This accounts for the steep beginning portion in curves X and Y. The resistance also increases the time constant for the charging of the condenser. When the switch opens a high voltage would ordinarily be generated by the rapid decay of flux in the core of transformer 112. However, the condenser which is discharged at the instant of opening of the switch absorbs the current that was flowing in the primary circuit until it becomes charged. The length of time for the condenser to charge and hence the length of time during which the flux in the transformer is decaying, depends on the time constant of the condenser and the resistance, which is equal to RC. By making the decay time long by choosing large values for R and C, the voltage generated in the transformer secondary is too small to break down the spark gap. This prevents having a double pulse applied to the crystal stack which might confuse the record. While the arrangement shown makes the voltage pulse upon closing of the switch, the opening of the switch can be used, by taking small values for resistance 113 and condenser 117 and breaking the current rapidly at the switch. In such case a larger pulse will be obtained on the break than on the make.

The crystal stack behaves somewhat like a condenser and will remain charged after a pulse has been applied to it, rendering it insensitive to succeeding pulses. This difficulty is overcome by placing a high resistance 120 of several megohms across the crystal stack as shown in Fig. 6, to discharge the crystals between pulses.

Figs. 7 and 8 show electro-magnetic type sound generators. In Fig. 7 there is provided a housing 121 containing a solenoid coil 122 with a soft iron hammer 123 arranged inside the coil and movable with respect thereto. The coil is intermittently energized by a battery 111 controlled by a switch 110 and motor 108, as in Fig. 6. Upon rotation of the cam intermittent pulses of energy are supplied to the coil, which causes the hammer to rise and strike an anvil 124 attached to a flexible diaphragm 125, as shown.

In Fig. 8 there is employed a bar 130 of magneto-strictive material such as nichrome or monel metal which has the property of changing length upon magnetization. The bar is rigidly mounted in a housing 131 by means of a support 132 and the other end is fastened at 133 to a flexible diaphragm 134. A coil 135 surrounds the bar and is supplied with current through a circuit comprising leads 136 and 137, and battery 111, switch 110, and a resistance 138. A condenser 139 is connected across the circuit as shown. Upon closing of the cam switch current from the battery energizes the coil and deflects the diaphragm which sends out a sound pulse. Upon opening of the switch the condenser 139 causes the current in the coil to decay gradually, preventing a second pulse from being generated.

If desired a portion of the energy can be diverted from the apparatus of Figs. 7 and 8 as is shown in connection with Fig. 6.

While the sound generators described are of the self-contained type, they can of course be supplied with energy from the surface of the ground if desired. However, the types shown are simpler.

As stated, in this embodiment of the invention, two detectors and a source are mounted in spaced relation. In Fig. 1 the two detectors are above the source, but the system gives as good results with the detectors below the source, as shown in Fig. 10. The functioning of this system is quite similar to that described in Fig. 1 and needs no further description. The invention also readily lends itself to provide a way for accurately locating stratum interfaces. Thus by mounting one detector above and one detector below the source, as indicated in Fig. 11, while the assembly is passing through a homogeneous stratum the two detectors will receive waves a constant time interval apart, and the amplitude of the two waves received will be the same. Upon penetration of the lower detector into a different stratum, the interval between the detector record traces changes and by noting the depth at which the interval begins to change, the stratum interface can be accurately located. Or, the depth at which the amplitude of the two traces varies may be noted. In most cases the two detectors are at different distances from the source, whatever their arrangement, but in Fig. 11 good results are achieved with the detectors spaced the same distance from the source.

The spacing between the detectors and the source varies widely depending upon the terrain being studied and upon the desired degree of resolving power; that is, ability to separate adjacent strata. In practice, the spacing between the three elements usually runs between 2 and 50 feet.

Referring to Fig. 12, this shows another specific embodiment of my method wherein there is lowered down the well by means of a supporting cable, reel and depth indicator (as shown in Fig. 1) an assemblage including a source of pulses of sound 200 and a detector 21 interconnected by a suspending means 202 which is a poor conductor of sound. Source 200 shown in detail in Fig. 13, comprises a stack of crystal plates 105 arranged in a casing 201 as in Fig. 6, but the self-contained actuating mechanism of Fig. 6 is omitted; the wires 115 and 116 from alternate electrodes being extended up the bore to the surface as shown. Detector 21 is identical to that shown in Fig. 5. The output of detector 21 after amplification is delivered to leads 204 carrying it to the surface where it is further amplified in amplifier 205. The output of amplifier 205 is delivered to leads 206 and 207, lead 206 being connected to the grid 208 of vacuum tube 209 which is of the gas triode, grid glow, or thyratron type in which a positive pulse on the grid causes the plate circuit to become highly conductive and remain so as long as there is sufficient plate voltage applied to the tube. The grid 208 is negatively biased by battery 210 and voltage divider 211 connected to lead 207 so that no plate current will flow through the tube until a pulse of predetermined strength is received from the amplifier 205. Tube 209 is provided with the usual cathode 220 and filament 212 and plate 213 connected through lead 214 to one side of the primary of a transformer 215, the other side of which is connected through voltmeter 216 and resistor 217 to the positive pole of battery 218. From the negative pole of the battery, lead 219 connects with the cathode 220 of tube 209. A condenser 221 is connected across battery 218 through the meter 216 and resistor 217.

The system shown in Fig. 12 operates as follows:

To start the system operating it is necessary to create an original pulse of current through the circuit. This can be done in many ways, but perhaps the most convenient is to decrease the bias on tube 209 by changing the adjustment of the voltage divider 211 so that some random pulse or noise is produced in the circuit sufficient to start a series of pulses in a manner hereinafter described.

The first pulse received at detector 21 is converted into an electrical pulse which travels through leads 204 to amplifier 205 and thence to the grid 208 of tube 209. The grid has previously been negatively biased by battery 210 through leads 207 and 206 so that no plate current would flow through the tube, but when the pulse received overcomes this bias, the plate current of tube 209 flows through transformer 215 sending a new pulse to source 200 through leads 203. The source, in turn creates an acoustic pulse in the well which, after traveling through the adjacent rock, is picked up by detector 21 thus completing the cycle.

The manner in which a definite pulse is created each time is as follows: Battery 218 charges condenser 221 to a predetermined potential, the condenser 221 remaining charged until a pulse makes tube 209 conductive by overcoming the bias imposed through battery 210. When the bias is overcome and the tube becomes conductive, the plate circuit will discharge condenser 221 very rapidly through the primary of transformer 215, thus creating a sharp pulse at source 200 and discharging the condenser almost completely. As soon as this occurs, tube 209 ceases to be conductive and condenser 221 is almost immediately recharged through the resistor 217.

Once condenser 221 is charged fully, no current will flow to it through meter 216. Each time it is discharged a constant and definite amount of current must flow through meter 216 to replace the lost charge. Hence, the average amount of current flowing through the meter will be directly proportional to the rate of the pulses in the circuit and the meter is made to read this rate directly by employing a meter having enough inertia to average the pulses. Since the rate or frequency of the pulses is almost directly proportional to the velocity of sound through the rock formations the meter indicates the sound velocity and is conveniently calibrated in terms of velocity for a spacing of, say, 5 or 10 feet between the source and the detector.

Various time constants of the various elements of the circuit require control in order to operate the circuit successfully. For instance, some time will be required for the pulses to travel up and down the cables, from the sound source to the rock formation, and the formation to the detector. The time during which a pulse travels through the circuit from detector back to the sound source should be kept to a constant delay period of the order of 0.0002 second. The time of travel from the sound source to the detector may vary from 0.0001 second to 0.02 second, depending on the spacing used and the velocities at which sound will travel through the particular formation encountered. It is desirable for accuracy, although not essential, to charge condenser 221 to at least 95 per cent of its capacity within a minimum time of about 0.0002 second which it takes for a pulse to complete the circuit. This is done by making the resistor 217 and condenser 221 small. Condenser 221 must discharge more rapidly than it charges, to maintain continuous oscillations. This discharge can be made almost instantaneous by using a low impedance discharge circuit. The rapidity of this discharge also enhances the sharpness of the pulse sent down the well to source 200.

The graph of Fig. 14 illustrates some of the variations taking place in the circuit during the progress of time. Curve J shows the variation of the voltage on condenser 221. At point $a$ the condenser is caused to discharge at a very rapid rate by a pulse in the circuit. The discharge continues for perhaps a few millionths of a second until a minimum potential $b$ is reached at which time tube 209 ceases to conduct due to its low plate voltage, then the current from battery 218 commences to recharge the condenser. In about 0.0001 second a point of maximum voltage $c$ is reached where the condenser is almost completely recharged. This voltage remains constant until the new pulse arrives as indicated at $a'$, after which the voltage again drops to a minimum $b'$ and gradually increases to a maximum $c'$ in the recurrence of the cycle.

Curve K shows the variation of the voltage with time in the grid 208 of tube 209. Considering the pulse shown at $a$ on curve J, after this has traveled through the leads 115, 116 to the source 200 through the formation, detector 21 and leads 204 through the amplifier 205 it will arrive at the grid 208 of tube 209 at a time $d$ shown on curve K. It will be noticed that at an instant $d$, corresponding in time to instant $a'$ in curve J, the grid voltage exceeds a critical value represented by the dotted line $e$—$e$, and thus the plate circuit becomes conductive. This critical value can be varied by adjusting the bias on the grid with voltage divider 211. The plate current will flow in pulses such as indicated in curve L, the pulses being all identical and consisting of the discharge current from condenser 221 plus a slight but constant amount of charging current from battery 218. Meter 216 merely averages or counts the equal pulses. The meter can be so designed as to give instantaneous reading by inspection or it can be designed to inscribe a permanent record on a chart.

While the invention has been described with reference to sound waves, i. e. elastic waves of audible frequency, the principles are equally well applicable to ultra-sonic waves, that is waves of frequency outside the audible range (approximately 40–30,000 vibrations per second) and the term sound waves as used herein is intended to include such ultra-sonic waves.

Ordinarily the waves made use of are the first arrivals at the detectors. The longitudinal waves in the rock are of higher velocity than transverse waves and are thus selected for measurement, while the transverse waves are ignored.

What I claim is:

1. A method of making stratigraphic surveys in earth bores, comprising the steps of generating a pulse of sound at one level in the bore so as to cause propagation of a sound wave through the surrounding rock, detecting sound waves at a level different from said level, causing the detected sound waves to generate a second pulse of sound at said first level, and repeating the steps, the number of pulses emitted per unit of time being a measure of the velocity of sound through the rock between said two levels.

2. Apparatus for making stratigraphic surveys in earth bores, comprising means adapted, upon actuation, to generate a pulse of sound in the bore at one level of the bore, means at a different level in the bore for detecting sound from said generating means after passage thereof through the surrounding rock, and means constructed and arranged for actuating said generating means, upon receipt of each pulse of sound at the detecting means, whereby a series of pulses of sound are propagated at a rate depending on the velocity of sound through the rock between said two levels.

3. In apparatus for making acoustical stratigraphic surveys in bores, the combination of detecting means, and means for emitting sharp, single pulses of sound comprising an acoustic diaphragm, electrical means adapted upon energization to move the diaphragm, a transformer having a primary and a secondary, a source of direct current in circuit with the primary, a circuit connecting the secondary with said diaphragm-moving means, a spark gap in said secondary circuit, a condenser in parallel across the primary circuit, and a switch controlling said primary circuit, whereby upon closing and opening the switch a single sharp pulse of sound is emitted; and means for suspending the detecting means and the pulse emitting means in a bore.

4. An apparatus for making stratigraphic surveys in earth bores, comprising means adapted upon electrical energization to generate a sharp pulse of sound, electrical sound detecting means, means for suspending both said means in spaced relationship in a bore, an electrical control circuit connecting the detecting means and the sound generating means, so constructed and arranged that the generating means is energized intermittently at a rate determined by the time of travel of sound between the generating means and the detecting means, and a galvanometer in said circuit for measuring the average value of current flowing therein.

5. A method of making stratigraphic surveys in well bores and the like, comprising the steps of generating a sharp, single pulse of sound at some level in a bore, detecting the sound pulse at two points spaced from each other and from the point at which sound is generated and recording said detected impulses, and repeating said steps at other levels in the bore whereby inferences can be drawn as to the acoustic properties of the ground surrounding the bore, from the difference in recorded first-arrival times of the pulse at said two spaced points.

6. An apparatus for making stratigraphic surveys in bores, comprising means for emitting single sharp, separate pulses of sound at regular spaced intervals with relatively long intervening quiet intervals, a pair of sound detectors, means for suspending said pulse-emitting means and detectors in spaced relationship to each other in a bore, and means for recording the first-received pulses of sound at the detectors, whereby the velocity of sound in the rock between the two detectors can be determined by measurement of the time interval between the recorded pulses.

7. An apparatus for locating strata interfaces in bores, comprising means for emitting single, separate sharp pulses of sound at regular spaced intervals, the elapsed time between pulses being long in relation to the duration of each pulse, a pair of sound detectors one above and one below the pulse-emitting means, means for suspending said pulse-emitting means and detectors in spaced relationship to each other in a bore, and means for recording the first-received pulses of sound at the two detectors, whereby strata interfaces can be located.

RALPH D. WYCKOFF.